(No Model.) 2 Sheets—Sheet 2.
M. S. DUFFY.
Culinary Vessel.
No. 241,631. Patented May 17, 1881.
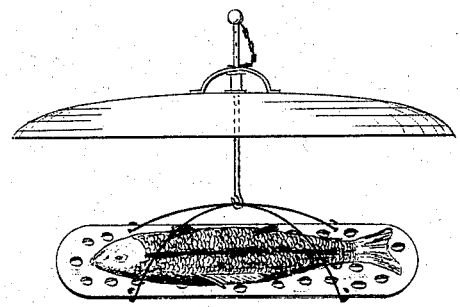
FIG. 9
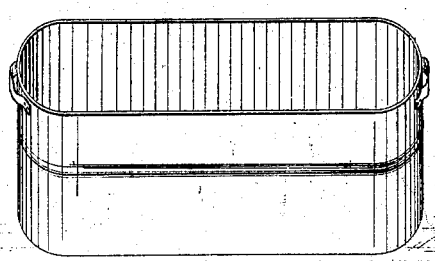
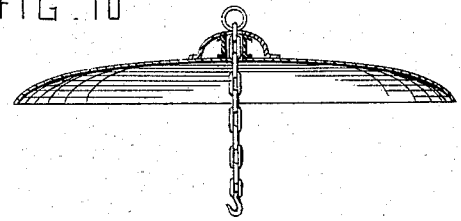
FIG. 10     FIG. 11
WITNESSES:     INVENTOR
Herman Moran.     Margaret S. Duffy.
    By H. A. Seymour,
    Atty.

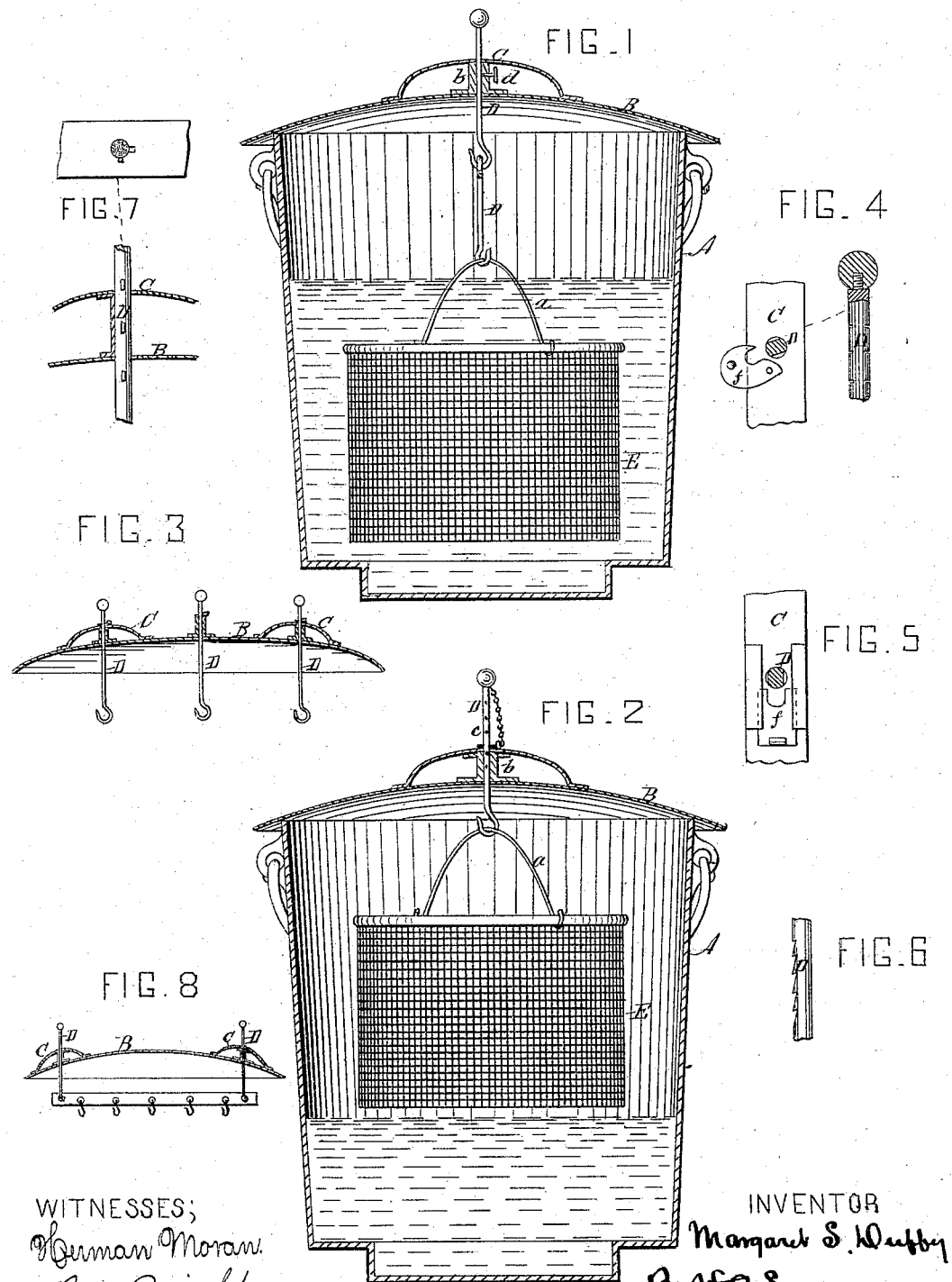

UNITED STATES PATENT OFFICE.

MARGARET S. DUFFY, OF HYATTSVILLE, MARYLAND.

CULINARY VESSEL.

SPECIFICATION forming part of Letters Patent No. 241,631, dated May 17, 1881.

Application filed March 30, 1881. (No model.)

*To all whom it may concern:*

Be it known that I, MARGARET S. DUFFY, of Hyattsville, in the county of Prince George and State of Maryland, have invented certain new and useful Improvements in Culinary and other Vessels; and I do hereby declare the following to be a full, clear, and exact description of the invention, such as will enable others skilled in the art to which it pertains to make and use it, reference being had to the accompanying drawings, which form part of this specification.

This invention relates to an improvement in culinary and other vessels, the principal object of the invention being to facilitate the placing and removing of articles of food in a cooking-vessel, and to suspend said articles of food from the lid or cover, and adjust them to to any desired vertical position within the pot in such a manner as to entirely submerge them in the water or suspend them above the surface of the water in the steam-space, by means of which the food may be boiled, steamed, or strained after being boiled, and adapted to be bodily removed by detaching the lid or cover from the pot.

With these ends in view the invention consists, essentially, in providing the lid or cover with one or more apertures, and arranging a sliding rod to pass through said apertures in such a manner as to be vertically adjustable and detachable, by which the food or other articles may be suspended and adjusted within said vessel, or be submerged in the water, or be held above the water in said vessel, or entirely removed therefrom by removing the lid.

It further consists in interposing a thimble or ferrule between the lid and handle thereof, said lid and handle having apertures through them registering with the bore of said thimble or ferrule, and a valve by which the said aperture may be controlled, and also in other details of construction, as will be hereinafter more fully set forth.

Before further describing the construction and operation of this device I may observe that it is well known that vessels have been placed within each other for the purpose of cooking and steaming, and that some of them have been perforated for the purpose of allowing the free flow of water through them, and also for the purpose of straining said articles. It is also well known that in boiling puddings and many other articles of food—such as fish, rice, vegetables, &c.—much difficulty is experienced in removing them from the cooking vessel or pot, and particularly in the case of puddings and other heavy articles in bulk, which cannot be removed by the methods alluded to. These articles, when just about to be removed from and raised to the top of the pot, sometimes slip, and, falling suddenly back, the boiling water splashes out, thus scalding the attendant.

Now, to improve the various well-known methods, and to avoid the evils pointed out, and also the danger attendant thereupon, and also to preserve from burning and mixing the various articles of food, are further aims of my invention.

Referring more particularly to the drawings, Figure 1 shows a vertical cross-section taken on a line through the lid and handle of the boiler, in which the crate is submerged. Fig. 2 represents a similar view with the crate above the water-surface in the steam-space. Fig. 3 shows the lid or cover of an oblong or oval pot, with a number of sliding or suspending rods passing through it, one of them passing through the lid without the handle, which will answer the purpose in some cases. Fig. 4 shows part of a sliding rod, it having notches or grooves, and a portion of said figure shows a plan view of the top of the handle, clearly showing the lock or catch, which also forms a cover or valve for closing the aperture when the rod is removed. Figs. 5, 6, and 7 are modifications, showing different methods of retaining the rod in any desired vertical position. Fig. 8 shows another plan of carrying out my invention. Fig. 9 represents a perspective view of a fish-boiler, the lid or cover being in position to be lowered onto the pot. A perforated plate upon which is placed a fish is represented as suspended from the lid, thus showing very clearly the operation and adaptability of the invention. Fig. 10 shows another modification of my device, in which is illustrated a flexible attachment, which may be used instead of the rod. A chain is shown in this instance, which may be secured by any approved means and may be raised, lowered, and retained in any vertical position desired. A flat piece may be substituted for the round rod or chain. Fig. 11 shows the thimble, rod, and staying device detached from the lid or cover. This figure is intended to show the device detached from the lid, and which is to be manufactured and put in bundles or in packages by the gross, for commercial use as an article of manufacture.

A is a boiler of the ordinary construction. B is the lid or cover; C, the handle; D, the vertically-sliding adjustable rod. E is the reticulated vessel, suspended from the rod D by the bail $a$. This perforated vessel or crate may be replaced by one of solid walls, and it may be provided with a solid top, so that milk, farina, dry puddings, or any other substance may be boiled and heated without being in direct contact with either the steam or the water in the pot.

$b$ shows the thimble or ferrule, interposed between the lid B and handle C. An angle-piece or any equivalent device may be substituted for the thimble, such, for instance, as shown by Fig. 7. The principal object of the ferrule is to brace and strengthen the handle, and to retain it more securely and rigidly to the lid or cover, and also to act as a guide to the lowering or raising of the vertically-sliding rod D. It will be observed that this rod D is provided with holes $c$, through which a pin may be inserted for holding it in position. As before stated, it may be held by other means, such as a set-screw, $d$, as shown at Fig. 1, or by grooves or serrations, or by projections, as shown at Fig. 7.

It is evident that the rod may be made longer or shorter by adding links or other equivalent means.

When it is desired to use the lid without the suspending attachment the rod D may be removed, and the catch $f$, serving as a valve, may be pushed over the aperture, thus preventing the escape of steam, making the lid perfectly tight.

It is obvious that this method of suspending articles in vessels may be applied to many uses. It may be employed in fish-boilers, ham-boilers, vegetable-boilers, glue-pots, and, in fact, in any vessel where it may be found useful outside of a kitchen, as well as in it.

The operation may be stated as follows: The parts being put together, the article of food, either fluid or solid, is put into a suitable vessel. The vessel or article is then fastened to the hook or other device at the end of the sliding rod D. The rod is then adjusted to the position that will insure the suspended article to be in the desired position in the boiler. The handle C is then taken hold of, and raising it raises all that is fastened to it. The food, or the vessel containing food, is then placed in the boiler ready to be cooked.

It is very evident that if the water should all be boiled out of the boiler by neglect or otherwise, (which is frequently the case,) the material within and suspended from the lid or cover would escape damage by burning.

In fact, the various advantages of this invention over the old methods and its capabilities are so general and apparent that further description is deemed unnecessary.

Having now described my invention, its construction and operation, what I claim as new, and desire to secure by Letters Patent, is—

1. A pot-lid and a handle, having a ferrule or thimble interposed between them and rigidly secured thereto, said handle, ferrule, and lid having an aperture through them adapted for the reception of a sliding rod, the handle having a lid or cover to close said aperture when the rod is removed, in the manner shown and described.

2. The combination, with a pot-lid, of a handle having a ferrule interposed between them and rigidly secured thereto, the above parts having an aperture through them, and a vertically-sliding rod so arranged as to be vertically adjustable and detachable, in the manner set forth.

3. A pot-lid having an aperture in its top, a vertically-sliding rod adapted to move therein, and a staying device, whereby said rod may be held in any desired vertical position, as shown and described.

4. A pot-lid provided with a culinary attachment suspended therefrom and arranged to be vertically adjustable from the outer or top of said lid, by which the article in the pot may be lowered or raised and adapted to be retained in any desired vertical position, in the manner shown and described.

5. The combination, with the lid of a culinary vessel, of a vertically-adjustable rod extending through said lid, the lower end of said rod being provided with a hook or equivalent device for the removable attachment thereto of a vessel, bag, or other devices or receptacle, substantially as described.

6. The combination, with the lid of a culinary vessel, of a vertically-adjustable rod extending through said lid, and a receptacle provided with a bail removably secured to the lower end of said rod, substantially as subscribed and shown.

7. As a new article of manufacture, the thimble, adjustable rod or chain, and device for securing the rod or chain to the thimble or ferrule in any desired adjustment, said parts being combined, substantially as and for the purpose specified.

In testimony that I claim the foregoing I have hereunto set my hand the 29th day of March, 1881.

MARGARET S. DUFFY.

Witnesses:
HENRY A. SEYMOUR,
A. W. BRIGHT.